United States Patent
Shah et al.

(10) Patent No.: US 8,472,944 B2
(45) Date of Patent: Jun. 25, 2013

(54) METHOD AND SYSTEM FOR DETERMINING SERVICE METRICS IN A WIRELESS NETWORK

(75) Inventors: Dipesh H. Shah, Fremont, CA (US); Kaushik D. Gohel, Atlanta, GA (US)

(73) Assignee: AT&T Mobility II, LLC, Atlanta, GA (US)

( * ) Notice: Subject to any disclaimer, the term of this patent is extended or adjusted under 35 U.S.C. 154(b) by 401 days.

(21) Appl. No.: 12/636,760

(22) Filed: Dec. 13, 2009

(65) Prior Publication Data
US 2011/0143748 A1 Jun. 16, 2011

(51) Int. Cl.
*H04W 24/00* (2009.01)
(52) U.S. Cl.
USPC ........ 455/424; 455/423; 455/452.1; 455/441; 455/456.1; 455/456.2
(58) Field of Classification Search
USPC ............. 455/424, 456.1, 456.2, 456.3, 456.4, 455/456.5, 456.6, 423, 452.1, 441
See application file for complete search history.

(56) References Cited

U.S. PATENT DOCUMENTS

| | | | |
|---|---|---|---|
| 7,248,868 B2 * | 7/2007 | Snyder et al. | 455/425 |
| 2006/0023642 A1 * | 2/2006 | Roskowski et al. | 370/254 |
| 2009/0143079 A1 * | 6/2009 | Klassen et al. | 455/456.3 |
| 2009/0312038 A1 * | 12/2009 | Gildea | 455/456.4 |
| 2010/0210301 A1 * | 8/2010 | Dietz et al. | 455/556.1 |
| 2011/0059754 A1 * | 3/2011 | Cai et al. | 455/456.3 |

OTHER PUBLICATIONS

Erin-Ee-Lin Lau et al., "Enhanced RSSI-Based High Accuracy Real-Time User Location Tracking System for Indoor and Outdoor Environments," International Journal on Smart Sensing and Intelligent Systems, vol. 1, No. 2, Jun. 2008, pp. 534-548.
Masakatsu Kourogi, et al., "Indoor/Outdoor Pedestrian Navigation with an Embedded GPS/RFID/Self-contained Sensor System," 16th International Conference on Artificial Reality and Telexistence (ICAT2006), Nov. 29-Dec. 1, 2006, pp. 1310-1321. (consists of 12 unnumbered pages.

* cited by examiner

*Primary Examiner* — Kamran Afshar
*Assistant Examiner* — Sayed T Zewari (57) ABSTRACT

A method and system for determining service metrics in a communications network are disclosed. The method measures a speed of a wireless endpoint device in an ongoing call, and collects call performance data. The method deems the ongoing call as being associated with a user who is mobile if the speed of the wireless endpoint device exceeds a speed threshold at any time during the ongoing call, or as being associated with a user who is stationary if the speed of the wireless endpoint device does not exceed or is equal to the speed threshold over a call duration. The method adds the call performance data to an aggregate service metrics for mobile users if the ongoing call is deemed as being associated with a user who is mobile, or to an aggregate service metrics for stationary users if the ongoing call is deemed as being associated with a user who is stationary.

19 Claims, 4 Drawing Sheets

METHOD AND SYSTEM FOR DETERMINING SERVICE METRICS IN A WIRELESS NETWORK

The present disclosure relates generally to communication networks and, more particularly, to a method and system for determining service metrics in a wireless network.

BACKGROUND

Wireless carriers need to design services and networks so that all users including the ones that are most challenged, such as indoor users, have a desired quality of service. Often, the indoor user is used as a benchmark to design the coverage of the network, because the indoor user, on average, typically experiences a weaker received signal strength versus outdoor users. Likewise, the outdoor user is often used as a benchmark to design the capacity of the network, because the outdoor user, on average, typically experiences higher interference versus indoor users. However, the service metrics that a wireless network provider maintains are often combined across all user types and they do not distinguish between indoor users and outdoor users. In addition, in current systems there is no accurate and efficient way to distinguish between user experiences for the users who are indoors versus those users who are outdoors.

SUMMARY

In one embodiment, the present disclosure discloses a method and system for determining service metrics in a wireless network. For example, the method measures a speed of a wireless endpoint device in an ongoing call, and collects call performance data of the ongoing call. The method deems the ongoing call as being associated with a user who is mobile if the speed of the wireless endpoint device exceeds a speed threshold at any time during the ongoing call, or deeming the ongoing call as being associated with a user who is stationary if the speed of the wireless endpoint device does not exceed or is equal to the speed threshold over a call duration. The method adds the call performance data to an aggregate service metrics for mobile users if the ongoing call is deemed as being associated with a user who is mobile, or adds the call performance data to an aggregate service metrics for stationary users if the ongoing call is deemed as being associated with a user who is stationary.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, an apparatus and a computer readable medium for determining service metrics in a wireless network. Although the present disclosure is discussed below in the context of a wireless access network and a packet network, e.g., an Internet Protocol (IP) Multimedia Subsystem (IMS) network, the present disclosure is not so limited. Namely, the present disclosure can be applied to any type of networks in which the present disclosure can be deployed, and the like.

Figure 1:
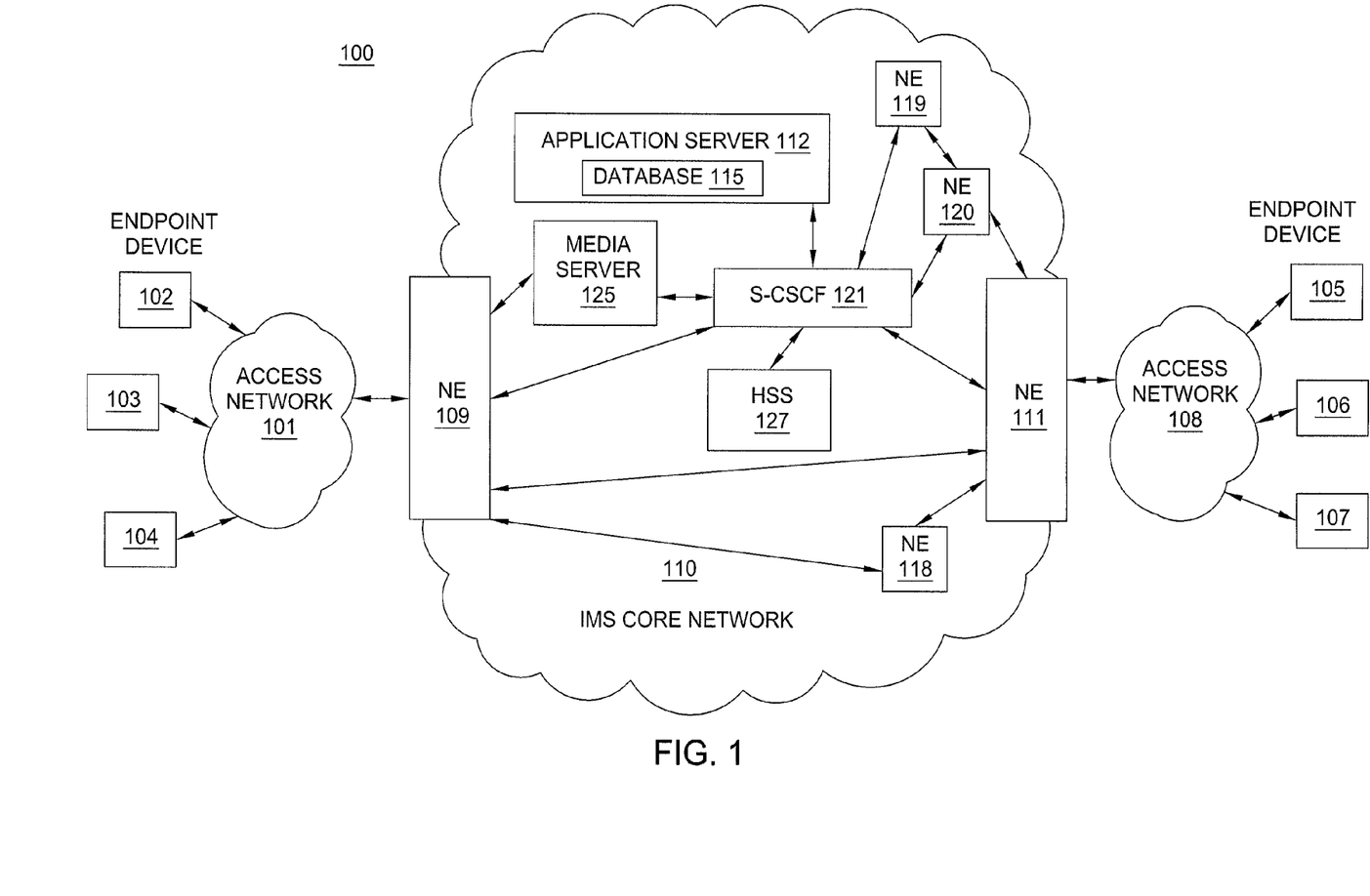
FIG. 1 illustrates an exemplary network related to the present disclosure.

To better understand the present disclosure, FIG. 1 illustrates an example network 100, e.g., an Internet Protocol (IP) Multimedia Subsystem network related to the present disclosure. An IP network is broadly defined as a network that uses Internet Protocol to exchange data packets.

In one embodiment, the network 100 may comprise a plurality of endpoint devices 102-104 that communicate with the core IMS network 110 (e.g., an IP based core backbone network supported by a service provider) via an access network 101. Similarly, a plurality of endpoint devices 105-107 communicate with the IMS core packet network 110 via an access network 108. The network elements 109 and 111 may serve as gateway servers or edge routers for the network 110.

The endpoint devices 102-107 may comprise customer endpoint devices such as personal computers, laptop computers, Personal Digital Assistants (PDAs), mobile phones, smart phones, email devices, messaging devices, and the like. The access networks 101 and 108 serve as a conduit to establish a connection between the endpoint devices 102-107 and the Network Elements (NEs) 109 and 111 of the IMS core network 110. The access networks 101 and 108 may each comprise a Digital Subscriber Line (DSL) network, a broadband cable access network, a Local Area Network (LAN), a Wireless Access Network (WAN), a $3^{rd}$ party network, a cellular network and the like. The access networks 101 and 108 may be either directly connected to NEs 109 and 111 of the IMS core network 110, or indirectly through another network.

Some NEs (e.g., NEs 109 and 111) reside at the edge of the IMS core infrastructure and interface with customer endpoints over various types of access networks. An NE that resides at the edge of a core infrastructure is typically implemented as an edge router, a media gateway, a proxy server, a border element, a firewall, a switch, and the like. An NE may also reside within the network (e.g., NEs 118-120) and may be used as a SIP server, a core router, or like device.

The IMS core network 110 also comprises a Home Subscriber Server (HSS) 127, a Serving-Call Session Control Function (S-CSCF) 121, a media server 125, and an Application Server 112 that contains a database 115. An HSS 127 refers to a network element residing in the control plane of the IMS network that acts as a central repository of all customer specific authorizations, service profiles, preferences, etc.

The S-CSCF 121 resides within the IMS core infrastructure and is connected to various network elements (e.g., NEs 109 and 111) using the Session Initiation Protocol (SIP) over the underlying IMS based core backbone network 110. The S-CSCF 121 may be implemented to register users and to provide various services (e.g., VoIP services). The S-CSCF interacts with the appropriate VoIP service related applications servers (e.g., 112) when necessary. The S-CSCF 121 performs routing and maintains session timers. The S-CSCF may also interrogate an HSS to retrieve authorization, service information, user profiles, etc. In order to complete a call that requires certain service specific features, the S-CSCF may need to interact with various application servers (e.g., various VoIP servers). For example, the S-CSCF may need to interact with another server for translation of an E.164 voice network address into an IP address, and so on.

The Media Server (MS) 125 is a special server that typically handles and terminates media streams to provide services such as announcements, bridges, and Interactive Voice Response (IVR) messages for VoIP service applications. The media server also interacts with customers for media session management to accomplish tasks such as process requests.

The application server 112 may comprise any server or computer that is well known in the art, and the database 115 may be any type of electronic collection of data that is also well known in the art. In one embodiment, the database 115 may store indoor and outdoor wireless call service metrics, as discussed in greater detail below. In another embodiment, the database 115 storing indoor and outdoor wireless call service metrics may be part of Access Network 101. Those skilled in the art will realize that the communication system 100 may be expanded by including additional endpoint devices, access networks, network elements, application servers, etc. without altering the scope of the present disclosure.

The above IP network is described only to provide an illustrative environment in which packets for voice and data services are transmitted on networks. The current disclosure discloses a method and system for capturing indoor and outdoor wireless call service metrics in an exemplary communication network (e.g., an IMS network) illustrated in FIG. 1 and as described above.

Figure 2:
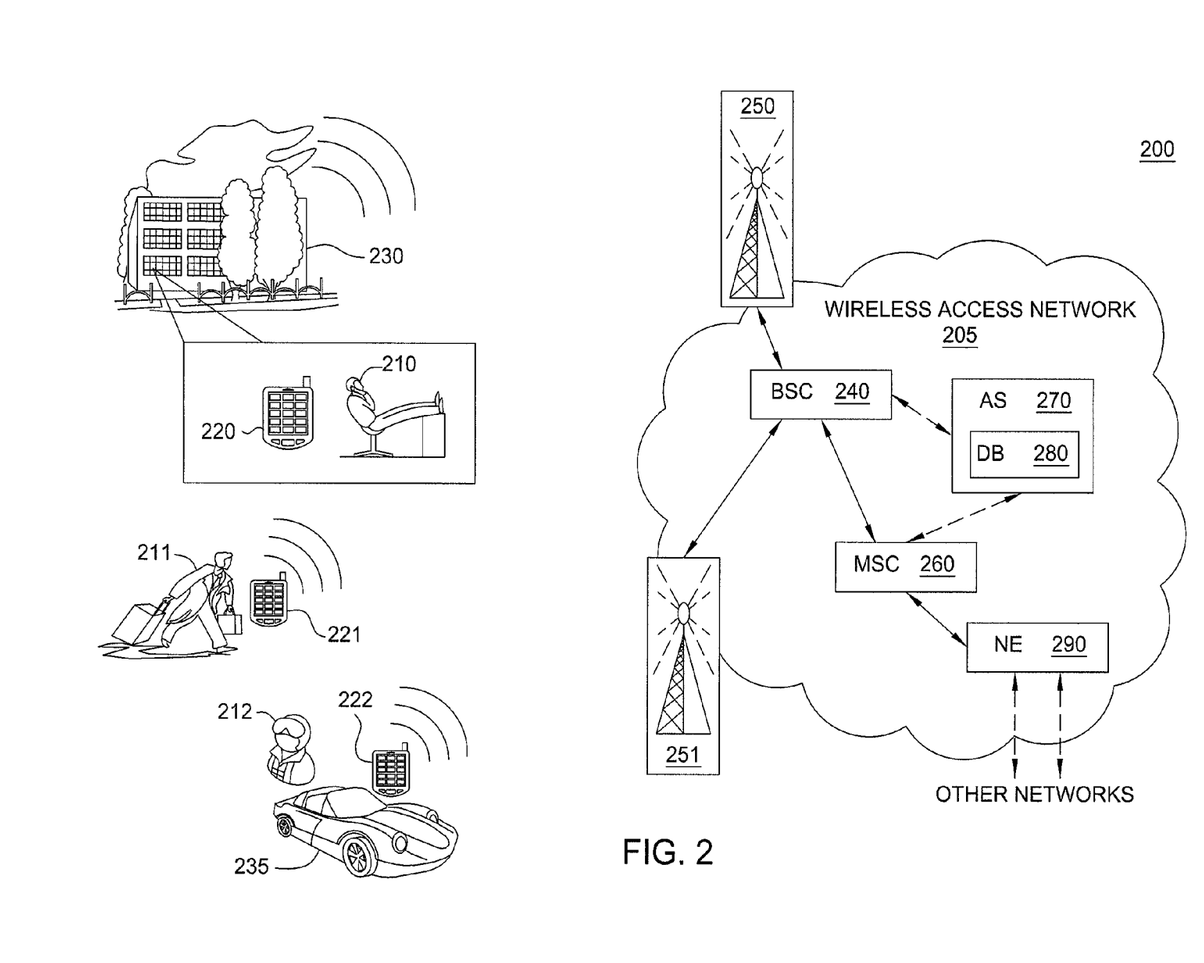
FIG. 2 illustrates an exemplary wireless access network related to the present disclosure.

FIG. 2 illustrates an exemplary access network 200 suitable for implementing embodiments of the present invention for determining indoor and outdoor wireless call service metrics. In one embodiment, the access network 200 comprises a wireless access network 205. Access networks 101 and 108 depicted in FIG. 1 may comprise, for example, a wireless access network 205 as shown in FIG. 2. Wireless access network 205 is configured to support wireless communication of users 210-212 via their respective wireless endpoint devices 220-222, with other wireless or wireline users. The link between wireless endpoint devices 220-222 and the wireless access network 205 comprises RF signals between the one or more base stations 250-251 and the wireless endpoint devices 220-222. Here only two base stations 250 and 251 are depicted. However, it should be appreciated that the wireless access network 205 may comprise any number of base stations depending upon the size and needs of the wireless access network. In addition, although only three users 210-212 and three wireless endpoint devices 220-222 are depicted, it should be appreciated that any number of users may be serviced at the same time by the wireless access network 205.

Each of the base stations 250-251 comprises, at a minimum, a RF transceiver, and is configured to receive and transmit RF signals to and from wireless endpoint devices (e.g., wireless endpoint devices 220-222). In one embodiment, the base stations 250-251 each includes a digital signal processor (DSP) that is capable of performing estimations of mobile endpoint device velocity or obtaining such information from a dedicated velocity estimator. There are many algorithms that can be employed to estimate the mobile endpoint device velocity and the present invention can employ any one of these known algorithms, e.g., algorithms that estimate the speed of the mobile endpoint device by determining the approximate doppler frequency for the mobile endpoint device. The ability of the base stations to estimate the mobile endpoint device velocity will be further discussed below in the context of determining indoor and outdoor wireless call service metrics.

Furthermore, it should be noted that in one embodiment the mobile endpoint device velocity can in fact be measured directed by the mobile endpoint device itself. Thus, one or more pertinent call performance data as further discussed below also can be measured by the mobile endpoint device itself. In turn, the velocity and any of the pertinent call performance data can be forwarded from the mobile endpoint device to the wireless access network for further processing.

As illustrated in FIG. 2, base stations 250-251 may support calls for a plurality of mobile users 210-212 who are using their wireless endpoint devices 220-222 in different environments, e.g., an indoor environment versus an outdoor environment. For example, user 210 may be engaged in a call supported by the base station 250 using endpoint device 220 while seated at an office desk inside the office building 230. User 211, on the other hand, may be outside walking while engaged in a call supported by the base station 250 using the wireless endpoint device 221. Finally, user 212 may be engaged in a call supported by the base station 251 using wireless endpoint device 222 while driving on a highway in the user's vehicle 235. Thus, user 210 can be broadly referred to as an indoor user, whereas users 211 and 212 can be broadly referred to as outdoor users in the above example. In one embodiment of the present invention, it is desirable to capture wireless call service metrics for these two types of users. More importantly, it is beneficial to distinguish wireless call service metrics associated with indoor users versus wireless call service metrics associated with outdoor users as described further below.

Returning to FIG. 2, to manage the communications of multiple users serviced by the wireless access network 205, the wireless access network 205 may comprise one or more network elements. For example, the wireless access network 205 may comprise one or more base station controllers (BSCs) and/or Radio Network Controllers (RNCs) for managing RF communication of the base stations 250-251. Although only one BSC/RNC 240 is depicted in FIG. 2 it should be understood that any number of BCSs/RNCs can be deployed. For example, each base station 250-251 could be serviced by its own BSC/RNC; or multiple base stations can be served by a BSC/RNC. BSC/RNC 240 performs a variety of wireless network management related tasks such as wireless channel assignments, determining transmission power levels, and controlling handovers from one base station to another base station, and the like. It should be noted that some of the functionalities of BSC/RNC could be implemented in the base stations 250-251. Similarly, some of the functionalities of BSC/RNC could be implemented in the MSC 260.

In one embodiment, wireless access network 205 includes at least one mobile switching center (MSC) 260. Among other functions, the MSC 260 may maintain user profile records for users currently serviced by the base stations within the portion of the wireless access network that is the responsibility of MSC 260. For example, the MSC provides the information that is needed to support mobile service subscribers, such as user registration and authentication information. The MSC may also function as a media gateway and/or media gateway controller facilitating communication between the wireless access network 205 and other networks. For example, in a typical circuit-switched wireless communication systems, the MSC may connect the landline public switched telephone network (PSTN) system to the wireless communication system. Thus, the MSC 260 may be responsible for connecting calls from users 210-212 to other wireless users or to users on other networks such as the PSTN, VoIP networks, asynchronous transfer mode (ATM) or frame relay networks, etc via a network element 290.

In one embodiment, the wireless access network 205 may also include an application server 270. The application server 270 may include a database 280 suitable for storing call data records and/or indoor and outdoor wireless call service metrics, as will be described in greater detail below. The application server 270 may be configured to provide one or more functions supporting calls via the wireless access network 205. For example, application server 270 may comprise any server or computer that is well known in the art, and the database 280 may be any type of electronic collection of data that is also well known in the art. In other embodiments, the call service metrics including the indoor and outdoor metrics may be stored in base station 250, BSC/RNC 240 or MSC 260 or a combination thereof.

Although the network elements deployed within the wireless access network 205 have been described as one or more discrete devices, it should be appreciated that the functionality described with respect to each network element is not limited to the particular device as described and depicted herein. Rather, the embodiment of FIG. 2 is merely illustrative of one wireless access network configuration that is suitable for implementing embodiments of the present invention. Thus, any other network elements providing the same functionality described herein with respect to the wireless access network 205 would be equally suitable for use in accordance with embodiments of the present invention. Those skilled in the art will realize that the wireless access network 205 may be expanded by including additional endpoint devices, base stations, BSCs, MSCs, SGSNs, GGSNs, network elements, application servers, etc. without altering the scope of the present disclosure.

Figure 3:
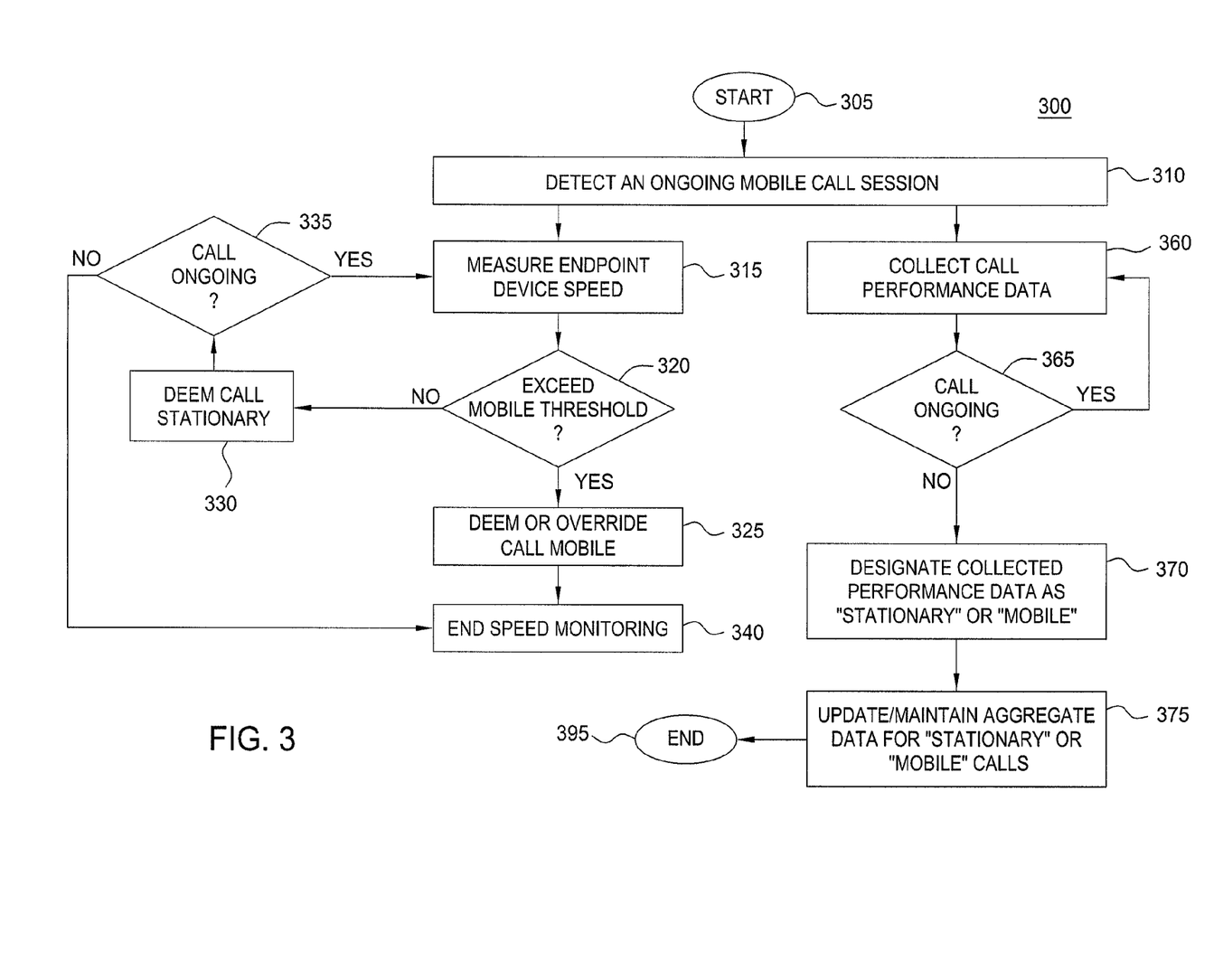
FIG. 3 illustrates a flowchart of a method for capturing indoor and outdoor wireless call service metrics.

FIG. 3 illustrates a flowchart of a method 300 for capturing indoor and outdoor wireless call service metrics. One or more steps of the method 300 can be performed by one or more of the components of the wireless access network 205 or the IMS core network 110. For example, in one embodiment one or more steps of the method 300 can be implemented by the base stations 250-251, and AS 270 of FIG. 2. Alternatively, if the indoor and outdoor wireless call service metrics are to be stored and processed in the IMS core network, then one or more steps of the method 300 can be implemented by the AS 112 of FIG. 1. The method begins in step 305 and proceeds to step 310.

At step 310, the method detects an ongoing mobile call session. For example, in the wireless access network 205, the user 210 with the endpoint device 220 is engaged in an ongoing call with another user. In order to establish and support the call session, an over-the-air link is established between the endpoint device 220 and the base station 250. The link may broadly comprise a "channel" used for communication between the endpoint device 220 and the base station 250. When an ongoing mobile call session is detected or established, e.g., by the base station 250, the method simultaneously begins measuring wireless endpoint device speed at step 315 and start collecting call performance data at step 360.

At step 315, the method measures wireless endpoint device speed. For example, upon detecting an ongoing mobile call session involving a wireless endpoint device 210, the method measures the current speed of the wireless endpoint device 210. As mentioned above, the current speed of the wireless endpoint device can be determined by the DSP deployed at the base station 250. In one embodiment the method takes measurements in accordance with a predefined time interval, e.g., every 20 ms, 40 ms, and so on. However, the present invention is not limited to a particular predefined time interval. Thus, in one embodiment, the measurements are taking place in substantially real time.

In step 320, the measured wireless endpoint device speed is compared to a speed threshold or a mobile threshold. For example, in one embodiment a wireless network provider may set a configurable threshold that is used to distinguish between a user who is considered stationary and a user who is considered to be mobile. For example, low speed movement made by a user may not exceed the threshold and the user will be considered to be stationary. On the other hand, a user who is walking at a brisk pace or driving in a car will likely exceed the threshold and therefore will be considered mobile. For instance, in FIG. 2 user 210 may be seated at a desk in office building 230 while engaged in a call supported by the base station 250. This user is likely to be categorized as "stationary" since the user is clearly not moving at a high speed. It should be noted that the category "stationary" is a relative term and should not be interpreted to mean that the user is completely still or immobilized. For example, the user 210 may certainly move about the office, but such low speed movement relative to a moving vehicle will be deemed to be stationary. In one embodiment, a user that is deemed to be stationary is also deemed to be "indoor", e.g., within a physical structure like a building, a house, a warehouse, and the like.

Alternatively, user 212 may be driving on a highway in his car 235 while engaged in a call supported by the base station 251 using the mobile endpoint device 222. In this scenario, user 212 is most likely to be categorized as "mobile" due to the high rate of speed of the car traversing the highway. In this embodiment, a user that is deemed to be mobile is also deemed to be "outdoor", e.g., outside of a physical structure like a building, a house, a warehouse, and the like.

Finally, user 211 engaged in a call supported by the base station 250 using endpoint device 221 can be deemed to be stationary or mobile. In other words, he may be categorized as either "mobile" or "stationary" depending upon the speed at which he is walking and the specified speed threshold. In this embodiment, the user is deemed to be "outdoor", if his walking speed exceeds the speed threshold, and the user is deemed to be "indoor", if his walking speed does not exceed or is equal to the speed threshold.

In one embodiment, the threshold can be selected to be 0.75 meter/second, 1 meter/second, 1.5 meters/second, and so on. Thus, for example speed threshold of 1 meter/second, if the user's speed is estimated to be less than or equal to 1 m/s then the user is considered stationary. However, if the user' speed is estimated to be greater than 1 m/s then the user is considered mobile. It should be noted that this specific threshold is only illustrative and is not intended to limit the scope of the present invention. For example, the selected speed threshold can be selected to correspond to an average walking speed of a human adult, or to correspond to a speed that is just below the average walking speed of a human adult, and so on.

In one embodiment, the speed threshold is selected to be just below the average walking speed. Thus, if the measured speed is greater than the speed threshold, then it is assumed that the user is walking. In one embodiment, a user that is deemed to be walking is also considered to be "outdoor". Of course, there may be instances where an indoor user, say in a large office building, is walking and exceeds the speed threshold while using his or her mobile endpoint device. This user may therefore be categorized as mobile (and is assumed to be an outdoor user). Thus, there is a small margin of error built into this arrangement. This margin of error can be addressed based upon the level of accuracy for the metrics to be collected as required for a particular implementation. For example, if the data collection method is willing to err on the side where outdoor users are erroneously deemed to be indoor users, then the speed threshold can be raised. Whereas, if the data collection method is willing to err on the side where indoor users are erroneously deemed to be outdoor users, then the speed threshold can be lowered.

Returning to step 320, if the measured mobile endpoint device speed does not exceed or equals the speed threshold, the method proceeds to step 330 where the call session is deemed be a stationary call or a user who is stationary. If the measured mobile endpoint device speed does exceed the speed threshold, the method proceeds to step 325 where the call session is deemed or overrided be a mobile call or a user who is mobile.

At step 335, the method determines if the call is still ongoing. For example, a base station 250 may detect that mobile endpoint device 220 is still engaged in an ongoing call. If the call session is still ongoing, then the method returns to step 315 to take another speed measurement. On the other hand, if the method determines that the call session has ended, such as detecting an end of call signal, the method proceeds to step 340.

At step 340, the method ends speed monitoring. In addition, at step 340, the categorization of the call session as either mobile or stationary has been determined and will not change.

It should be noted that the above flow is organized in a manner that once the call session is deemed to a mobile session, i.e., the user is mobile, then the entire call session is determined to be mobile. In contrast, if the call session is deemed to a stationary session in one instance in time, i.e., the user is stationary for one measurement, the call session is still repeatedly monitored to ensure that the user remains stationary. If any time during the call session where the measurement indicates that the user is mobile, then the call session is deemed to be a mobile session and the call session is no longer monitored for the assessing the speed of the mobile endpoint device. In other words, in one embodiment if during any portion of an ongoing call session the method determines that the wireless endpoint device speed has exceeded the speed threshold, then the entire call session is deemed to be a mobile call session. Thus, if even one sample taken at the DSP indicates that the speed threshold is crossed, the entire call session is considered to be a mobile call session. For example, if during a call session a user in a car is travelling at 25 mph and then stops at a traffic light, this embodiment will not distinguish between the moving portion of the call session and the stopped portion of the call session. Since at least a portion of the call involved movement in excess of the threshold (e.g., 2 m/s) then the entire call session should be considered a mobile call session.

Following step 325, the method proceeds to step 340 where wireless endpoint device speed monitoring ends. Also, as mentioned above, at step 340, the categorization of the call session as either mobile or stationary remains fixed.

Following step 340, the speed monitoring branch of the method 300 proceeds to step 370 and awaits completion of the call performance data collection branch of the method, which will now be described.

As mentioned above, when the method 300 initially detects an ongoing call session at step 310 the method simultaneously proceeds with endpoint device speed measurements at step 315 and collecting call performance data, or service metrics, at step 360.

At step 360, the method collects call performance data for the ongoing call session. For example, in one embodiment the method may measure received signal strength (RSS). Such measurements may take place, in one embodiment at a base station 250 with respect to an ongoing call for user 210 with the endpoint device 220. It should be noted that other types of service metrics/call performance data may be additionally and/or alternatively measured at step 360 and may be dependent upon the particular wireless technology. For example, for wideband wireless networks, including UMTS 3G and CDMA, possible parameters that a network provider may wish to monitor may be: $E_c/I_o$ (ratio of average channel power to total signal power), frame erasure rate (also known as frame error rate), received signal code power (RSCP) or block error rate. For GSM, possible parameters may include receive signal strength (RxLev), Rx signal quality (RxQual) and frame erasure rate/frame error rate. These measurements can be for uplink received signal or downlink received signal. Thus, signal strength is only one illustrative metric that is measured, but the present invention is not so limited. A number of other call performance parameters can also be measured and analyzed, e.g., block error rate, the number of retransmissions and/or packet loss rate. For example, the dropped call rate, which may reflects the ability of the wireless network to maintain the call throughout the duration, can be measured and collected.

At step 365, the method determines if the call session is still ongoing. If the query is affirmatively answered, then the method returns to step 360 to continue to collect call performance data. If the query is negatively answered, the method proceeds to step 370.

At step 370, the method designates call performance data collected in step 360 with the determination of whether the call session is "mobile" or "stationary" as determined in steps 325 or 330 respectively. Thus, a notation of whether the call session is a mobile call or a stationary call is associated with the call performance data collected for that call.

At step 375, the method in one embodiment uses the notation of whether the call session is a mobile call or a stationary call to determine which aggregate records should include the call performance data. For example, the method may separately maintain aggregate service metrics for stationary users and aggregate service metrics for mobile users. If the call session is deemed "stationary," the measured call performance data for the particular mobile call session is added to the corresponding aggregate service metrics maintained for stationary calls. On the other hand, if the call session is deemed "mobile," the method adds the measured call performance data to the corresponding aggregate service metrics for mobile calls.

Collectively, the aggregate service metrics may comprise database records such as sequential lists, with call performance data for each call comprising a unique tuple. Alternatively, or in addition, the aggregate service metrics may comprise summation over all or a portion of a number of collected call performance data records. Alternatively, or in addition, the aggregate service metrics may comprise average statistics over all or a portion of a number of collected call performance data records. For example, the method may maintain an hourly, daily and/or weekly average call performance data statistics for all or a portion of all calls through a base station or on a network. In various embodiments, the aggregate service metrics may be further segregated by user device type, geographic location, time of day, or other useful categorizations.

Regardless of the exact manner of maintaining the aggregate service metrics, the records will be distinguishable between the two primary categories: mobile calls and stationary calls. In addition, as mentioned above, the method in one embodiment assumes that all call sessions that are categorized as mobile calls are considered to be outdoor calls, whereas all call sessions that are categorized as stationary calls are also considered to be indoor calls. Thus, to the extent the method maintains individual and aggregate service metrics that distinguish between mobile and stationary calls, any data that is indicated as being mobile- or stationary-specific will also reflect any differences between indoor and outdoor wireless call service metrics.

Also at step 375, the method stores the updated aggregate service metrics for mobile calls and stationary calls. For example, the aggregate service metrics may be updated and maintained in a memory portion of the base station 250. However, as described above, the base station 250 may be in communication with one or more elements in the wireless access network 205 or indirectly with one or more elements in the IMS core network 110. Accordingly, in another embodiment the base station 250 may transmit the call performance data and/or aggregate service metrics for the calls to a central repository. For example, application server (AS) 270 in the wireless access network 205 may have its own database 280 which maintains call performance data or aggregate service metrics gathered from one or more base stations.

In one embodiment, the base station 250 may forward all collected call performance data to the AS 270 which may perform the correlating of step 370 and/or the updating of step 375. In one embodiment, the base station 250 uploads stored call performance data or aggregate service metrics on a predefined schedule, which may be a configurable parameter set by a network provider.

In addition, although steps of the exemplary method 300 have been described as taking place at, or being performed by a base station and/or one or more of its components, some or all of the steps may take place at, or be performed by a wireless endpoint device itself, and the call performance data is then conveyed back to the base station, wireless access network, and/or IMS core network.

It should be noted that although not specifically specified, one or more steps of method 300 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 3 that recite a determining operation or involve a decision, do not necessarily require that both branches of the determining operation be practiced. In other words, one of the branches of the determining operation can be deemed as an optional step.

Figure 4:
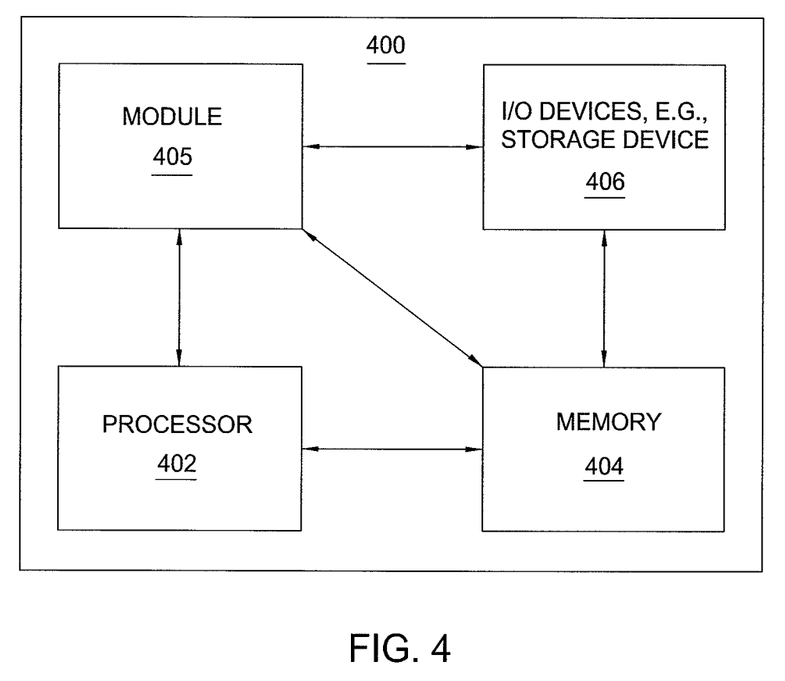
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for determining indoor and outdoor wireless call service metrics, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 405 for determining indoor and outdoor wireless call service metrics can be loaded into memory 404 and executed by processor 402 to implement the functions as discussed above. As such, the present method 405 for determining indoor and outdoor wireless call service metrics (including associated data structures) of the present disclosure can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for categorizing service metrics in a communication network, comprising:
   determining an ongoing call as being associated with a user who is mobile if a speed of the wireless endpoint device exceeds a speed threshold at any time during the ongoing call, or determining the ongoing call as being associated with a user who is stationary if the speed of the wireless endpoint device is, at most, equal to the speed threshold over a call duration, wherein the determining is performed by an application server deployed within the communication network; and
   adding, by the application server, call performance data of the ongoing call to an aggregate service metric for mobile users if the ongoing call is deemed as being associated with a user who is mobile or adding the call performance data to an aggregate service metric for stationary users if the ongoing call is deemed as being associated with a user who is stationary.

2. The method of claim 1, wherein the communication network comprises a wireless access network.

3. The method of claim 1, wherein the wireless access network is in communication with an internet protocol multimedia subsystem network.

4. The method of claim 1, wherein the speed of the wireless endpoint device is measured by a base station in communication with the wireless endpoint device.

5. The method of claim 4, wherein the call performance data of the ongoing call is collected by the base station.

6. The method of claim 1, wherein the speed of the wireless endpoint device is measured by the wireless endpoint device.

7. The method of claim 6, wherein the call performance data of the ongoing call is collected by the wireless endpoint device.

8. The method of claim 7, wherein the wireless endpoint device sends the call performance data that is collected to a wireless access network.

9. The method of claim 1, wherein the call performance data comprises at least one of; a received signal strength, a received signal quality, a received signal code power, a received signal carrier to interference ration, a received energy per bit to noise power spectral density ratio, a bit error rate a signal-to-noise ratio, a ratio of average channel power to total signal power, a frame erasure rate, a block error rate, a number of retransmissions, a packet loss rate, or a dropped call rate.

10. A non-transitory computer-readable storage medium storing a plurality of instructions which, when executed by a processor of an application server deployed in the communication network, cause the processor to perform operations for categorizing service metrics in a communication network, the operations comprising:
   determining an ongoing call as being associated with a user who is mobile if a speed of the wireless endpoint device exceeds a speed threshold at any time during the ongoing call, or determining the ongoing call as being associated with a user who is stationary if the speed of the wireless endpoint device is, at most, equal to the speed threshold over a call duration; and adding call performance data of the ongoing call to an aggregate service metric for mobile users if the ongoing call is deemed as being associated with a user who is mobile or adding the call performance data to an aggregate service metric for stationary users if the ongoing call is deemed as being associated with a user who is stationary.

11. The non-transitory computer-readable storage medium of claim 10, wherein the communication network comprises a wireless access network.

12. The non-transitory computer-readable storage medium of claim 10, wherein the wireless access network is in communication with an internet protocol multimedia subsystem network.

13. The non-transitory computer-readable storage medium of claim 10, wherein the speed of the wireless endpoint device is measured by a base station in communication with the wireless endpoint device.

14. The non-transitory computer-readable storage medium of claim 13, wherein the call performance data of the ongoing call is collected by the base station.

15. The non-transitory computer-readable storage medium of claim 10, wherein the speed of the wireless endpoint device is measured by the wireless endpoint device.

16. The non-transitory computer-readable storage medium of claim 15, wherein the call performance data of the ongoing call is collected by the wireless endpoint device.

17. The non-transitory computer-readable storage medium of claim 16, wherein the wireless endpoint device sends the call performance data that is collected to a wireless access network.

18. The non-transitory computer-readable storage medium of claim 10, wherein the call performance data comprises at least one of: a received signal strength, a received signal quality, a received signal code power, a received signal carrier to interference ration, a received energy per bit to noise power spectral density ratio, a bit error rate, a signal-to-noise ratio, a ratio of average channel power to total signal power, a frame erasure rate, a block error rate, a number of retransmissions, a packet loss rate, or a dropped call rate.

19. A system for categorizing service metrics in a communication network, comprising:
a processor deployed in the communication network; and
a computer-readable medium in communication with the processor, to store a plurality of instructions which, when executed by the processor, cause the processor to perform operations, the operations comprising:
determining an ongoing call as being associated with a user who is mobile if a speed of the wireless endpoint device exceeds a speed threshold at any time during the ongoing call, or determining the ongoing call as being associated with a user who is stationary if the speed of the wireless endpoint device is, at most, equal to the speed threshold over a call duration; and
adding call performance data of the ongoing call to an aggregate service metric for mobile users if the ongoing call is deemed as being associated with a user who is mobile or adding the call performance data to an aggregate service metric for stationary users if the ongoing call is deemed as being associated with a user who is stationary.

* * * * *